(12) United States Patent
Ziauddin et al.

(10) Patent No.: US 6,493,708 B1
(45) Date of Patent: Dec. 10, 2002

(54) TECHNIQUES FOR HANDLING FUNCTION-DEFINED HIERARCHICAL DIMENSIONS

(75) Inventors: Mohamed Ziauddin, Fremont, CA (US); Andrew Witkowski, Foster City, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/517,361

(22) Filed: Mar. 2, 2000

(51) Int. Cl.[7] ............................................. G06F 17/30
(52) U.S. Cl. ............................................................ 707/3
(58) Field of Search ................................ 707/1, 2, 3, 4, 707/200

(56) References Cited

U.S. PATENT DOCUMENTS 5,991,754 A * 11/1999 Raitto et al. .................. 707/2
6,061,692 A * 5/2000 Thomas et al. ............ 707/200
6,199,063 B1 * 3/2001 Colby et al. .................. 707/4
2001/0013030 A1 * 8/2001 Colby et al. .................. 707/1

* cited by examiner

*Primary Examiner*—Wayne Amsbury
*Assistant Examiner*—Nguyen Camlinh
(74) *Attorney, Agent, or Firm*—Brian D. Hickman; Hickman Palermo Truong & Becker LLP

(57) ABSTRACT

Techniques are described which allow function-defined hierarchies to be registered with a database server. The information provided to the server during the registration process is used by the server to determine how to roll up data that has been aggregated at one level of a function-defined hierarchy to another level of the function-defined hierarchy. Techniques are also provided to perform rollup from one level of a function-defined hierarchy to another level of the function-defined hierarchy on data stored in a materialized view. Further, techniques are provided for rewriting queries that require aggregation at one level of a function-defined hierarchy to cause them to access data from a materialized view that stores data at a different level of the function-defined hierarchy.

18 Claims, 4 Drawing Sheets

| month | quarter | year | month_sales |
|-------|---------|------|-------------|
| m1 | q1 | 1980 | $342 |
| m2 | q1 | 1980 | $5342 |
| m5 | q2 | 1980 | $533 |
| m22 | q5 | 1988 | $124 |
| m36 | q7 | 1975 | $925 |
| ⋮ | ⋮ | ⋮ | ⋮ |
| m512 | q46 | 1985 | $7200 | mv2 time_tab 102

| time_key | day | month | quarter | year |
|---|---|---|---|---|
| 1 | 12 | m1 | q1 | 1980 |
| 2 | 42 | m2 | q1 | 1980 |
| 3 | 3 | m5 | q2 | 1980 |
| 4 | 44 | m22 | q5 | 1988 |
| 5 | 775 | m36 | q7 | 1975 |
| ⋮ | ⋮ | ⋮ | ⋮ | ⋮ |
| 5000 | 54 | m512 | q46 | 1985 |

108

FIG. 1A time_tab2 120

| time_key | sale_date |
|---|---|
| 1 | 4839 |
| 2 | 4840 |
| 3 | 4841 |
| 4 | 4850 |
| 5 | 4851 |
| 6 | 4852 |
| ⋮ | ⋮ |

FIG. 1B mv3

| month | month_sales |
|---|---|
| m1.q1.1980 | $342 |
| m2.q1.1980 | $5342 |
| m5.q2.1980 | $533 |
| m22.q5.1988 | $124 |
| m36.q7.1975 | $925 |
| ⋮ | ⋮ |
| m512.q46.1985 | $7200 |

FIG.3

TECHNIQUES FOR HANDLING FUNCTION-DEFINED HIERARCHICAL DIMENSIONS

FIELD OF THE INVENTION

The present invention relates to database systems and, more particularly, to techniques for handling function-defined hierarchical dimensions.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Computer database systems that are used for data warehousing frequently store pre-computed summary information in summary tables in order to speed up query processing. The data from which the summary tables are generated are referred to as base data. The tables that contain the base data are referred to as base tables. Summary tables typically store aggregated information, such as "sum of PRODUCT_SALES, by region, by month." Other examples of aggregated information include counts of tally totals, minimum values, maximum values, and average calculations.

In the context of database systems, a "dimension" is a list of values that provide categories for data. A dimension acts as an index for identifying values of a variable. For example, if sales data has a separate sales figure for each month, then the data has a MONTH dimension. That is, the data is organized by month.

Dimensions may have many levels of granularity, where a hierarchical relationship exists between members of the various levels. For example, one dimension may be "geography", where geography has the following levels: city, state, region, country. Of these levels, "city" has the finest granularity, while "country" has the coarsest. Each level of a hierarchical dimension is associated with a set of values. For example, the "city" level of the geography dimension may be associated with values "NYC", "LA", and "SF", each of which represents a city. The values associated with a given hierarchical level are referred to as the "granules" of that level. The values associated with the level of finest granularity are referred to as base granules.

In analytical applications, the data stored in tables of a data warehouse is generally aggregated along dimensions and hierarchies. A typical example is the summation of dollar sales by time, where time is a dimension which includes different levels such as day, week, month, quarter, and year. The time granules occur at different levels of data abstraction and form a hierarchy.

Typically, an analytical application asks for an aggregated result up to some level of data abstraction. For example, the application may ask for sum-of-sales by week, where all sale amounts for each week are summed into a single aggregated value. Other examples are sum-of-sales by month, sum-of-sales by year, etc.

Because of the hierarchical relationship, if sum-of-sales by month is already computed, then sum-of-sales by year can be simply computed by summing the monthly sum-of-sales. The technique of deriving values for a coarser level in the hierarchy based on values associated with a finer level in the hierarchy is known as "rolling up" the values. For example, the monthly sum-of-sales may be rolled up into yearly sum-of-sales.

In a data warehouse, a dimension such as "time", is usually broken out into different granules, where a different table column is used to store the granules for each of the hierarchical levels. The granules are hierarchically related to each other. For example, cal_day → cal_month → cal_quarter → cal_year represents a calendar hierarchy in a time dimension. Another example, store → city → state → region → country represents a geographic hierarchy in a store dimension.

A hierarchy, such as the calendar hierarchy, can be declared as follows:

```
CREATE DIMENSION time_dim
    LEVEL cal_day      IS time_tab.day
    LEVEL cal_month    IS time_tab.month
    LEVEL cal_quarter  Is time_tab.quarter
    LEVEL cal_year     IS time_tab.year
    HIERARCHY calendar _rollup (
    cal_day            CHILD OF
    cal_month          CHILD OF
    cal_quarter        CHILD OF cal_year );
```

This declaration includes various LEVEL statements that identify the levels of the hierarchy. From the perspective of the database server, the LEVEL statements identify the various columns that should be created for the time_dim dimension table. The declaration further includes a HIERARCHY section that identifies the hierarchical relationships between the various the levels. Once the hierarchy "calendar_rollup" is declared, a database server can use this information to determine which levels can be rolled up to other levels. This information is used by the server when it rewrites queries in terms of materialized views.

A materialized view is a table where the pre-computed data corresponding to a materialized view definition is stored. For example, a materialized view "mv1" may be defined as follows:

CREATE MATERIALIZED VIEW mv1
AS
   SELECT t.month, t.quarter, t.year,
     sum(f.dollar_sales) as month_sales
   FROM fact_tab f, time_tab t
   WHERE f.time_key=3D t.time_key
   GROUP BY t.month, t.quarter, t.year;

Once a materialized view has been created, a database server may answer some queries that are issued against the base table with data from the materialized view. For example, a user may submit the following query (Q1) that asks for sum-of-sales by month:

Query Q1:
SELECT t.month, SUM(f.dollar_sales) as sum_sales
FROM fact_tab f, time_tab t
WHERE f.time_key=3D t.time_key
GROUP BY t.month;

Query Q1 requests a join to be performed between two base tables: fact_tab and time_tab. Scanning the based tables and performing the join operation may involve a significant amount of overhead. To avoid this overhead, the server can rewrite query Q1 to access data from mv1, instead of performing a join of fact_tab and time_tab. In the present example, query Q1 maybe rewritten as:

Rewritten query Q1':
SELECT mv1.month, mv1.month_sales as sum_sales
FROM mv1;

The rewritten query Q1' produces the same results as the original query Q1, but requests the retrieval of data from mv1 rather than from a join between fact_tab and time_tab. Consequently, the amount of overhead required to process the rewritten query Q1' may be several orders of magnitude less than the overhead required to process the original query Q1.

In the example given above, query Q1' requires sales to be summed by month. Conveniently, materialized view mv1 contains data that has already been summed by month. Consequently, rewritten query Q1' does not involve any additional aggregation. However, when the hierarchical relationship between the levels of a dimension are known, queries that require aggregation at a relatively coarser level of a dimension can be rewritten to access a materialized view that stores data that has been aggregated at a relatively finer level of that dimension.

For example, suppose the user submits a query (Q2) that asks for sum-of-sales by year. Knowing the calendar_rollup hierarchy declared in time_dim, the server can still rewrite Q2 to access data from mv1 instead of performing a join of fact_tab and time_tab.

Query Q2:
SELECT t.year, SUM(f.dollar_sales) as sum_sales
FROM fact_tab f, time_tab t
WHERE f.time_key=3D t.time_key
GROUP BY t.year;

To access mv1, query Q2 may be rewritten as:
Rewritten query Q2':
SELECT mv1.year, SUM(mv1.month_sales) as sum_sales
FROM mv1
GROUP BY mv1.year;

In the rewritten query Q2', the month_sales values stored in mv1 are summed up (rolled up) into yearly sum-of-sales. The server knows that yearly sales can be derived from monthly sum_of_sales because of the hierarchy information stored in the dimension declaration.

As explained above, one mechanism for defining a hierarchical dimension, the various levels thereof, and the relationships between the levels, is through a "CREATE DIMENSION" statement that has the following form:

```
CREATE DIMENSION time_dim
    LEVEL cal_day      IS time_tab.day
    LEVEL cal_month    IS time_tab.month
    LEVEL cal_quarter  Is time_tab.quarter
    LEVEL cal_year     IS time_tab.year
    HIERARCHY calendar _rollup (
        cal_day        CHILD OF
        cal_month      CHILD OF
        cal_quarter    CHILD OF cal_year );
```

The above statement, which creates a dimension called time_dim, declares hierarchical relationships between different columns of a dimension table time_tab. Specifically, the levels cal_day, cal_month, cal_quarter, and cal_year are respectively associated with columns time_tab.day, time_tab.month, time_tab.quarter, and time_tab.year of the time_tab dimension table. FIG. 1A illustrates a time_tab dimension table that may be created in response to such a declaration.

The dimension table 102 embeds the hierarchical relationships between granules in the various levels of the dimension. For example, row 108 indicates a mapping between the day granule "3", the month granule "m5", the quarter granule "q2" and the year granule "1988". When a hierarchical dimension is represented by a dimension table that has one column for each hierarchical level, rolling up aggregate values from a finer level to a coarser level may merely involve a re-aggregation of aggregated values using the appropriate column at the coarser level, or a join between the materialized view and the dimension table followed by a re-aggregation of aggregated values using the coarser level column.

For example, the materialized view may be created with a column for each level of the hierarchy, and the roll-up may be performed by aggregating based on groups associated with the appropriate column. For example, mv1 was created with a year column, so rolling values in mv1 up to the year level may be performed based on the year column of mv1.

Alternatively, if columns at coarser levels of the hierarchy, such as quarter and year, are not stored in mv1, the database server may join mv1 to time_tab 102 to determine the year value associated with each of the rows in mv1, and aggregate the dollar_sales value of all rows of mv1 that correspond to the same year value.

Another technique for defining a hierarchical dimension involves supplying functions which, when applied to granules at finer levels of a hierarchical dimension, produce the corresponding granules for coarser levels of the hierarchical dimension. For example, rather than have a dimension table (such as time_tab 102) to indicate the hierarchical relationship between granules in the various levels of the time dimension, various user functions may be provided.

For example, a time dimension can be stored in a single column rather than in a set of columns. A base granule in its encoded form is stored in a single column, and a set of user functions are provided to derive coarser granules from the base granule. FIG. 1B illustrates an example of such dimension table (dim_tab2 120), where encoded based granules for the time dimension are stored in a single "sale_date" column. A user function to_day converts the base granule sale_date into the corresponding calendar day, another user function to_month converts sale_date into corresponding calendar month, etc. The relationship between the levels of the time dimension hierarchy may be represented as: to_day (sale_date) → to_month(sale_date) → to_quarter(sale_date) → to_year(sale_date). A hierarchy defined in this fashion is referred to herein as a "function-defined hierarchy".

It is possible to derive coarser granules from base granules when the base granules are encoded to store information about the corresponding coarser granules. Example of situations in which coarser granules may be derived from base granules include:

(1) a base granule based on the standard ANSI SQL datetime datatype which encodes information about time-of-day, day, week, month, quarter, year, century, etc.

(2) a base granule that is an object class encapsulating information about all coarser granules with corresponding methods to extract coarser granules from the base class, and (3) a base granule that is a user-defined datatype with corresponding user-defined functions that retrieve or compute coarser granules from the user-defined base granule.

When a hierarchy level is associated with a function, the hierarchy level does not correspond to a column of a dimension table. In fact, a dimension table need not even exist for a dimension whose hierarchy levels are defined by function. Thus, while columns "month" and "year" of time_tab 102 are used to determine which year corresponds to a particular month value for a time dimension without a function-defined hierarchy, the function to_year is used to determine which year corresponds to a particular sale_date value in a time dimension that has a function-defined hierarchy.

Just as with hierarchical dimensions that are not function-defined, it is possible to create summary tables that store pre-computed aggregate data that has been aggregated up to a particular level of a function-defined hierarchy. For example, the following statement defines a materialized view mv2 in terms of the base granule "sale_date" and user-defined functions:

CREATE MATERIALIZED VIEW mv2
AS
   SELECT to_month(t.sale_date) as month,
     to_quarter(t.sale_date) as quarter,
     to_year(t.sale_date) as year,
       sum(f.dollar_sales) as month_sales
   FROM fact_tab f, time_tab2 t
   WHERE f.time_key=t.time_key
   GROUP BY to_month(t.sale_date),
     to_quarter(t.sale_date),
     to_year(t.sale_date);

FIG. 2 is a block diagram that illustrates a materialized view mv2 that may have been created in response to this statement.

Just as with hierarchical dimensions that are not function-defined, it is desirable to be able to satisfy some queries that are directed to fact_tab and dim_tab2 with data from mv2, rather than by scanning and joining the base tables. For example, a user may submit a query (Q3) that asks for sum-of-sales by month by using the user-defined function to_month, as follows:

Query Q3:
   SELECT to_month(t.sale_date) as month,
     SUM(f.dollar_sales) as sum_sales
   FROM fact_tab f, time_tab2 t
   WHERE f.time_key=3D t.time_key
   GROUP BY to_month(t.sale_date);

Satisfying query Q3 from the base tables fact_tab and time_tab2 incurs the potentially enormous overhead associated with scanning and joining the two tables. So Q3 can be rewritten in terms of mv2 to cut down the overhead based on the fact that the GROUP BY clause of Q3 is a proper subset of the GROUP BY clause of mv2.

However, if the GROUP BY clause of Q3 was to_year (sale_date) and the GROUP BY clause of mv2 had to_month(sale_date), then the Q3 cannot be rewritten using mv2 unless a function-defined hierarchy declares that it is possible to derive year granules from month granules.

Based on the foregoing, it is desirable to provide a technique that allows queries that are not directed to a materialized view to be answered with data from the materialized view even when the queries require aggregation across a hierarchical dimension that has a function-defined hierarchy.

SUMMARY OF THE INVENTION

Techniques are provided to allow function-defined hierarchies to be registered with a database server. The information provided to the server during the registration process is used by the server to determine how to roll up data that has been aggregated at one level of a function-defined hierarchy to another level of the function-defined hierarchy. Techniques are also provided to perform rollup from one level of a function-defined hierarchy to another level of the function-defined hierarchy on data stored in a materialized view. Further, techniques are provided for rewriting queries that require aggregation at one level of a function-defined hierarchy to cause them to access data from a materialized view that stores data at a different level of the function-defined hierarchy.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram of a dimension table for a hierarchical time dimension;

FIG. 1B is a block diagram of another dimension table for the hierarchical time dimension;

FIG. 3 is a block diagram of a materialized view that does not contain granules for coarser levels of the time hierarchy, but that may be accessed by queries that require summary information at those coarser levels that are re-written according to the techniques described herein.

DETAILED DESCRIPTION OF THE PREFERRED EMBODIMENT

Figure 2:
FIG. 2 is a block diagram of a materialized view that may be accessed by a query that is re-written according to the techniques described herein.

Techniques are provided for allowing queries that are not directed to a materialized view to be answered with data from the materialized view even when the queries require aggregation across a hierarchical dimension that has a function-defined hierarchy. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

Techniques are provided to allow function-defined hierarchies to be registered with a database server. The information provided to the server during the registration process is used by the server to determine how to roll up data that has been aggregated at one level of a function-defined hierarchy to another level of the function-defined hierarchy. Techniques are also provided to perform rollup on data stored in a materialized view from one level of a function-defined hierarchy to another level of the function-defined hierarchy. Further, techniques are provided for rewriting queries that require aggregation at one level of a function-defined hierarchy to cause them to access data from a materialized view that stores data at a different level of the function-defined hierarchy.

REGISTERING FUNCTION-DEFINED HIERARCHICAL DIMENSIONS

According to one embodiment of the invention, a registration mechanism is provided that allows function-defined hierarchical dimensions to be registered in a manner similar to hierarchical dimensions that are not function-defined. In one embodiment, the function-defined hierarchical dimension time_dim2 can be declared as follows:

```
CREATE DIMENSION time_dim2
    LEVEL cal_day      IS to_day      (time_tab2.sale_date)
    LEVEL cal_month    IS to_month    (time_tab2.sale_date)
    LEVEL cal_quarter  IS to_quarter  (time_tab2.sale_date)
    LEVEL cal_year     IS to_year     (time_tab2.sale_date)
    HIERARCHY calendar _rollup2 (
        cal_day       CHILD OF
        cal_month     CHILD OF
        cal_quarter   CHILD OF cal_year );
```

Similar to the time_dim definition, the time_dim2 definition includes LEVEL statements that identify the levels of the hierarchy, and a HIERARCHY section that indicates the relationship between the levels. However, because time_dim2 is a function-defined hierarchical dimension, each level identifier is associated with a function, not a column. For example, the level cal_day is not associated directly with a column, but with function to_day, which computes a coarser granule from a base granule sale_date.

In response to the declaration of a function-defined hierarchical dimension, the database server "registers" the dimension. Because the hierarchy levels are function-defined, the registration process does not involve creating a dimension table that has columns for each of the dimension levels. Rather, a function-defined hierarchical dimension is registered by storing metadata that indicates (1) the identifier of each level, (2) the hierarchical relationship between the levels, (3) the function used to derive the granules for each level, and (4) the datatype of the parameters for each of those functions. For example, in response to registration of time_dim2, the database server stores metadata that indicates that cal_day identifies a level in the time_dim2 dimension, cal_day is a child of Cal_month, to_day is the function used to derive the granules of cal_day, and the parameter for cal_day is "sale_date".

As shall be described in greater detail hereafter, the server uses the metadata associated with the function-defined hierarchical dimension to rewrite queries to access data from materialized views rather than base tables, thereby avoiding significant overhead in certain circumstances.

REWRITE WITH UNNECESSARY ROLL-UP

For the purpose of illustration, it shall be assumed that time_dim2 has been declared and registered according to the technique described above, and that materialized view mv2 has been created. Materialized view mv2 includes dollar_sales values that have been aggregated up to the month level of the time dimension. If a user. submits a query (Q3) that asks for sum-of-sales by month by using the user-defined function to_month, the server can rewrite the query to access data from mv2 instead of performing a join between fact_tab and time_tab.

Query Q3:
    SELECT to_month(t.sale_date) as month,
        SUM(f.dollar_sales) as sum_sales
    FROM fact_tab f, time_tab2 t
    WHERE f.time_key=t.time_key
    GROUP BY to_month(t.sale_date);

Specifically, Q3 can be rewritten as:
Rewritten query Q3':
    SELECT mv2. month as month,
        sum(mv2.month_sales) as sum_sales
    FROM mv2
    GROUP BY month;

To derive the monthly sales values, rewritten query Q3' groups the month_sales values of mv2 by month, and sums the groups for each month. In the present example, such grouping and summing operations are unnecessary because the values in the month_sales column of mv2 are already aggregated at the month level.

However, the definition of mv2 groups based on month, quarter and year. When more than one level is specified in a GROUP BY clause, the aggregation will be performed at the finest of the specified levels. Consequently, unless it is known that "month" is finer than "quarter" and "year" (the other levels specified in GROUP BY clause of mv2), it must be assumed that the sales values in mv2 may be aggregated at a finer level than month. Thus, the aggregation and grouping specified in rewritten query Q3' ensures that the correct results will be produced under those circumstances.

REWRITE WITHOUT ROLL-UP

According to one aspect of the invention, the query rewrite mechanism of the database server inspects the metadata that has been registered for function-defined hierarchical dimensions to determine the finest level of the levels specified in the GROUP BY statement of the materialized view definition. If the aggregation level specified in a query is the finest of the levels specified in a materialized view definition, then the rewritten query created to access the materialized view need not specify further aggregation. For example, in the present example, the server is able to inspect the metadata generated for time_dim2 to determine that month has a finer granularity level than quarter and year. Because month has the finest granularity of the levels specified in the GROUP BY clause of mv2, and Q3 requests aggregation at the month level, the rewritten query need not perform further aggregation. Consequently, query Q3 may alternatively be rewritten as Q3":

Rewritten query Q3":
    SELECT mv2 month as month,
        mv2. month_sales as sum_sales
    FROM mv2;

In this example, no roll-up is performed because, based on the metadata associated with time_dim2, it was determined that mv2 stores sales values that have been aggregated to the same level as the aggregation required by the query Q3.

REWRITE WITH ROLL-UP

Based on the metadata associated with function-defined hierarchical dimensions, the server is not only able to determine when roll-up is unnecessary, but is also able to determine how to perform roll-up when it is necessary. For example, suppose the user submits a query (Q4) that asks for sum-of-sales by year.

Query Q4:
    SELECT to_year(t.sale_date) as year,
        SUM(f.dollar_sales) as sum_sales
    FROM fact_tab f, time_tab2 t
    WHERE f.time_key=3D t.time_key
    GROUP BY to_year(t.sale_date);

Knowing the calendar _rollup2 hierarchy declared in time_dim2, the server is able to rewrite Q4 to access data from mv2 instead of from a join of fact_tab and time_tab. Specifically, the metadata generated during the registration of time_dim2 indicates to the server that to_year corresponds to the year level, and that year level aggregates are derivable from month level aggregates. Further, from the definition of mv2 it is known that mv2 includes aggregates at the month level. Based on this information, the server is able to rewrite query Q4 as:

Rewritten query Q4':
SELECT mv2. year as year,
   SUM(mv2. month_sales) as sum_sales
FROM mv2
GROUP BY mv2.year;

FUNCTIONS WITH NON-BASE GRANULE PARAMETERS

In the case of time_dim2, the functions associated all levels use base granules for input parameters. However, according to one embodiment of the invention, support is provided for function-defined hierarchical dimensions that include functions that use non-base granules for input parameters. For example, another type of function hierarchy consists of an additional set of user functions that take as input the granule from the previous level, instead of the base granule. For example, consider the following declaration of dimension time_dim3:

```
CREATE DIMENSION time_dim3
   LEVEL cal_day      IS to_day      (time_tab2.sale_date)
   LEVEL cal_month    IS to_month    (time_tab2.sale_date)
   LEVEL cal_quarter  IS to_quarter  (time_tab2.sale_date)
   LEVEL cal_year     IS to_year     (time_tab2.sale_date)
      MAP to_month    TO day_to_month    (cal_day)
      MAP to_quarter  TO month_to_quarter (cal_month)
      MAP to_year     TO quarter_to_year  (cal_quarter)
   HIERARCHY calendar _rollup3 (
      cal_day      CHILD OF
      cal_month    CHILD OF
      cal_quarter  CHILD OF cal_year );
```

As specified in the declaration, the function day_to_month takes calendar day as input. The function month_to_quarter takes calendar month as the input. The function quarter_to_year takes calendar quarter as the input. After these function have been registered, it is possible for the server to compute coarser granules either from the base granule or from a granule at any of the previous levels in the hierarchy. For example, a calendar year granule can be computed from base granule as to_year(sale_date), or from calendar quarter as quarter_to_year(cal_quarter), or from calendar month as quarter_to_year(month_to_quarter (cal_month)), or from calendar day as quarter_to_year (month_to_quarter(day_to_month(cal_day))). In this type of function hierarchy, the granules produced at various levels in the hierarchy are themselves encoded units so it is possible to extract the next coarser granule from them.

Relative to the definition of time_dim2, the definition of time_dim3 includes additional user functions that can be nested within each other. These user functions are defined using the MAP clause. With these functions it is possible to produce a higher granule based on a granule that is at any of the previous levels in the hierarchy. The input to the nesting functions (declared by the MAP clause) is the level name which determines the nesting order. Each level is understood to be associated with a datatype that is produced by the corresponding hierarchical function (declared by LEVEL clause).

Because the granules produced by the user-defined functions are also encoded units, and there are user functions that operate on the encoded units, query rewrite techniques can take advantage of this property. For example, it is no longer necessary to store the higher level granules in a materialized view. For example, consider the following materialized view:

CREATE MATERIALIZED VIEW mv3
AS
   SELECT to_month(t.sale_date) as month,
      sum(f.dollar_sales) as month_sales
   FROM fact_tab f, time_tab2 t
   WHERE f.time_key=3D t.time_key
   GROUP BY to_month(t.sale_date);

A block diagram of a materialized view mv3 created based on this statement is illustrated in FIG. 3. In contrast to mv2, mv3 does not store quarter and year granules, but only month granules. If aggregation is required at a coarser level than month, the query rewrite mechanism rewrites queries in a manner that uses the registered function to derive the granules associated with the level specified in the queries. For example, even though mv3 does not contain year granules, query Q4 that requires aggregation at the year level may be rewritten to access mv3 as follows:

Rewritten query Q4 ":
SELECT quarter_to_year(month_to_quarter(mv3. month)) as year,
   SUM(mv3. month_sales) as sum_sales
FROM mv3
GROUP BY quarter_to_year(month_to_quarter(mv3. month));

BENEFITS AND ADVANTAGES

Using the techniques described herein, dimension hierarchies that are based on user-defined functions may be declared and registered. Based on the metadata generated during the registration process, the server is able to use such function hierarchies to rewrite a class of queries that had previously not been available for rewrite. Specifically, query rewrite is possible even though base granules have not been broken out into various coarser granules that are stored in discrete table columns.

In addition, the techniques take advantage of the user-defined functions that produce coarser granules in encoded forms. Specifically, if a function is provided to derive coarser granules from the encoded granules stored in materialized views, then the server is able to take advantage of the rewrite capability without storing the coarser granules in the materialized view. An advantage of not breaking out a base granule into higher granules and storing them in discrete dimension table columns is that, without the coarser granules, the dimension tables occupy less disk space. Another advantage is that the base granule can be stored in the fact table itself, thus removing the need for a separate dimension table. An advantage of not storing coarser granules in materialized views is that, without the coarser granules, the materialized views occupy less disk space and are easier to maintain. The materialized view maintenance is less expensive because joins from fact table to dimension tables may no longer be necessary.

HARDWARE OVERVIEW

Figure 4:
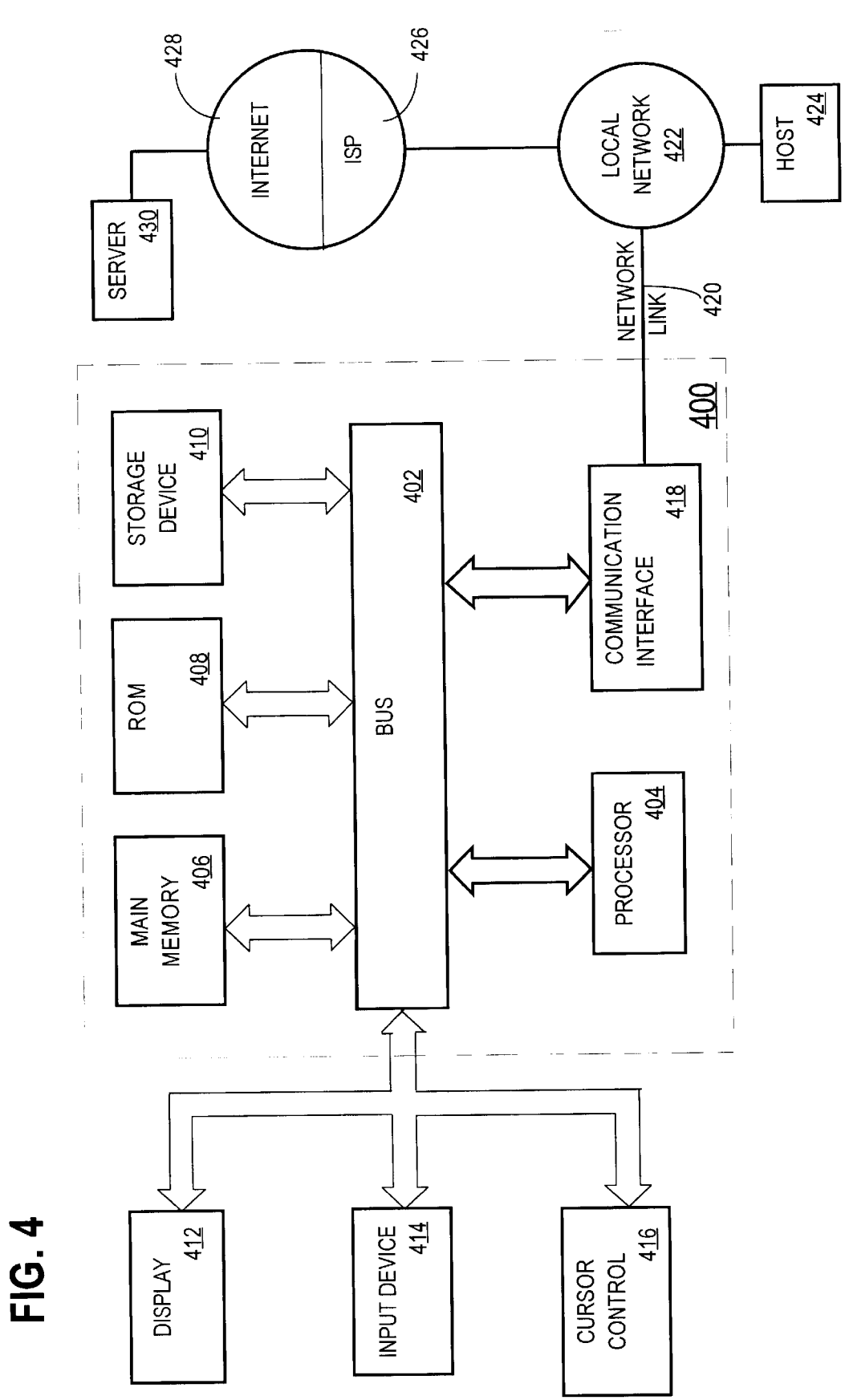
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for handling function-defined hierarchical dimensions in a database system, the method including the steps of:

receiving, by a database server, data that specifies a plurality of levels for a function-defined hierarchical dimension;

receiving, by said database server, data that specifies hierarchical relationships between said plurality of levels;

receiving, by the database server, data that specifies functions associated with each level of said plurality of levels; and registering said function-defined hierarchical dimension with said database server by storing metadata for said function-defined hierarchical dimension at a location accessible to said database server, wherein said metadata identifies:

said plurality of levels, said hierarchical relationships between said plurality of levels, said functions, and a mapping between the plurality of levels and the functions.

2. The method of claim 1 wherein:

the step of receiving data that specifies functions associated with each level of said plurality of levels includes the step receiving data that specifies a first function that generates granules associated with a first level of said plurality of levels based on granules associated with a second level of said plurality of levels; and said first level is coarser than said second level.

3. The method of claim 2 wherein:

the step of receiving data that specifies functions associated with each level of said plurality of levels includes the step receiving data that specifies a second function that generates granules associated with said first level of said plurality of levels based on granules associated with a third level of said plurality of granules; and said third level is different than said second level.

4. The method of claim 2 wherein the step of receiving data that specifies a first function that generates granules associated with a first level based on granules associated with a second level includes receiving data that specifies a first function that generates granules associated with a first level based on non-base granules.

5. A method for processing a query that references a table, requests aggregation of values selected from the table, and specifies that the aggregation be performed to a particular level of a function-defined hierarchical dimension, the method comprising the steps of:

determining that said particular level is one of a plurality of levels of said function-defined hierarchical dimension that are specified in a GROUP BY clause of a materialized view;

inspecting metadata associated with said function-defined hierarchical dimension to determine whether said particular level is the finest level of said plurality of levels; and if said particular level is the finest level of said plurality of levels, then rewriting said query to access the materialized view without performing any additional aggregation; and if said particular level is not the finest level of said plurality of levels, then rewriting said query to access the materialized view and to roll up values from said materialized view to said particular level.

6. A method for processing queries that reference a table and request aggregation of values selected from the table, wherein the. queries specify that the aggregation be performed at particular levels of a function-defined hierarchical dimension, the method comprising the steps of:

creating a materialized view that includes a column for granules associated with a first level of said function-defined hierarchical dimension;

in response to queries that reference said table and request aggregation to be performed at a second level of said function-defined hierarchy, rewriting said queries to access said materialized view and to aggregate to said second level by applying a function to values in said column for granules associated with said first level, wherein the first level is finer than said second level.

7. The method of claim 6 wherein the step of creating said materialized view includes creating said materialized view without any column for granules associated with said second level of said function-defined hierarchical dimension.

8. The method of claim 6 further comprising the step of inspecting metadata associated with said function-defined hierarchical dimension to determine that said function may be used to derived granules associated with said second level of said function-defined hierarchical dimension.

9. The method of claim 6 wherein the step of applying a function includes applying a plurality of nested functions, wherein an innermost function of said plurality of nested functions receives granules from said first level as input, and wherein an outermost function of said plurality of nested functions produces granules at said second level as output.

10. A computer-readable medium carrying one or more sequences of instructions for handling function-defined hierarchical dimensions in a database system, wherein execution of the one or more sequences of instructions by one or more processors causes the one or more processors to perform the steps of:

receiving, by a database server, data that specifies a plurality of levels for a function-defined hierarchical dimension;

receiving, by said database server, data that specifies hierarchical relationships between said plurality of levels;

receiving, by the database server, data that specifies functions associated with each level of said plurality of levels; and registering said function-defined hierarchical dimension with said database server by storing metadata for said function-defined hierarchical dimension at a location accessible to said database server, wherein said metadata identifies:

said plurality of levels, said hierarchical relationships between said plurality of levels, said functions, and a mapping between the plurality of levels and the functions.

11. The computer-readable medium of claim 10 wherein:

the step of receiving data that specifies functions associated with each level of said plurality of levels includes the step receiving data that specifies a first function that generates granules associated with a first level of said plurality of levels based on granules associated with a second level of said plurality of levels; and said first level is coarser than said second level.

12. The computer-readable medium of claim 11 wherein:

the step of receiving data that specifies functions associated with each level of said plurality of levels includes the step receiving data that specifies a second function that generates granules associated with said first level of said plurality of levels based on granules associated with a third level of said plurality of granules; and said third level is different than said second level.

13. The computer-readable medium of claim 11 wherein the step of receiving data that specifies a first function that generates granules associated with a first level based on granules associated with a second level includes receiving data that specifies a first function that generates granules associated with a first level based on non-base granules.

14. A computer-readable medium bearing instructions for processing a query that references a table, requests aggregation of values selected from the table, and specifies that the aggregation be performed to a particular level of a function-defined hierarchical dimension, the computer-readable medium bearing instructions for performing the steps of:

determining that said particular level is one of a plurality of levels of said function-defined hierarchical dimension that are specified in a GROUP BY clause of a materialized view;

inspecting metadata associated with said function-defined hierarchical dimension to determine whether said particular level is the finest level of said plurality of levels; and if said particular level is the finest level of said plurality of levels, then rewriting said query to access the materialized view without performing any additional aggregation; and if said particular level is not the finest level of said plurality of levels, then rewriting said query to access the materialized view and to roll up values from said materialized view to said particular level.

15. A computer-readable medium bearing instructions for processing queries that reference a table and request aggregation of values selected from the table, wherein the queries specify that the aggregation be performed at particular levels of a function-defined hierarchical dimension, the computer-readable medium bearing instructions for performing the steps of:

creating a materialized view that includes a column for granules associated with a first level of said function-defined hierarchical dimension;

in response to queries that reference said table and request aggregation to be performed at a second level of said function-defined hierarchy, rewriting said queries to access said materialized view and to aggregate to said second level by applying a function to values in said column for granules associated with said first level, wherein the first level is finer than said second level.

16. The computer-readable medium of claim 15 wherein the step of creating said materialized view includes creating said materialized view without any column for granules associated with said second level of said function-defined hierarchical dimension.

17. The computer-readable medium of claim 15 further bearing instructions to perform the step of inspecting metadata associated with said function-defined hierarchical dimension to determine that said function may be used to derived granules associated with said second level of said function-defined hierarchical dimension.

18. The computer-readable medium of claim 15 wherein the step of applying a function includes applying a plurality of nested functions, wherein an innermost function of said plurality of nested functions receives granules from said first level as input, and wherein an outermost function of said plurality of nested functions produces granules at said second level as output.

* * * * *

UNITED STATES PATENT AND TRADEMARK OFFICE
CERTIFICATE OF CORRECTION

PATENT NO.    : 6,493,708 B1  
DATED         : December 10, 2002  
INVENTOR(S)   : Mohamed Ziauddin et al.

It is certified that error appears in the above-identified patent and that said Letters Patent is hereby corrected as shown below:

<u>Column 14,</u>
Line 1, "the. queries" should read -- the queries --.

Signed and Sealed this

Twenty-fifth Day of March, 2003

JAMES E. ROGAN
*Director of the United States Patent and Trademark Office*